United States Patent [19]
Beard et al.

[11] Patent Number: 5,181,164
[45] Date of Patent: Jan. 19, 1993

[54] COMPARTMENT BARRIER FOR PADMOUNTED SWITCHGEAR

[75] Inventors: Lloyd R. Beard; Melvin B. Goe, Jr., both of Centralia, Mo.

[73] Assignee: A. B. Chance Company, Centralia, Mo.

[21] Appl. No.: 804,970

[22] Filed: Dec. 11, 1991

[51] Int. Cl.⁵ .............................................. H02B 1/14
[52] U.S. Cl. .................................. 361/345; 200/148 C; 200/304
[58] Field of Search ............... 361/331, 335, 337, 339, 361/343, 345; 200/48 R, 50 R, 50 AA, 144 R, 144 C, 145, 148 C, 304, 305

[56] References Cited

U.S. PATENT DOCUMENTS

| | | |
|---|---|---|
| 3,769,551 | 10/1973 | Corman et al. |
| 3,778,682 | 12/1973 | Bright |
| 4,146,915 | 3/1979 | Yosida ............................ 361/345 |
| 4,233,643 | 11/1980 | Iverson et al. |
| 4,486,815 | 12/1984 | Takahashi ........................ 361/339 |
| 4,565,908 | 1/1986 | Bould ............................ 200/50 AA |
| 4,620,076 | 10/1986 | Mrenna ............................ 200/305 |
| 4,689,716 | 8/1987 | Cooper et al. |
| 4,791,530 | 12/1988 | Kalvaitis et al. |
| 4,879,441 | 11/1989 | Hamm et al. |

FOREIGN PATENT DOCUMENTS 106386  8/1979  Japan .................................. 361/345

Primary Examiner—Gerald P. Tolin
Attorney, Agent, or Firm—Hovey, Williams, Timmons & Collins

[57] ABSTRACT

In an electrical distribution apparatus a switchgear device has a fixed element disposed within a shielded region of an enclosure of the apparatus, and a movable element supported for movement between a closed position in contact with the fixed element and an open position out of contact with the fixed element. The movable element is disposed at least partially within an access region of the enclosure when in the open position. A panel is supported between the shielded and access regions, and includes a slot through which the movable element passes during movement between the closed and open positions. A barrier member is movable horizontally relative to the panel between a blocking position covering the slot and a non-blocking position exposing the slot. The barrier member prevents inadvertent contact with the fixed element through the slot and prevents movement of the movable element between the open and closed positions when in the blocking position.

9 Claims, 2 Drawing Sheets

COMPARTMENT BARRIER FOR PADMOUNTED SWITCHGEAR

BACKGROUND OF THE INVENTION

1. Field of the Invention

The present invention relates generally to an insulating barrier for use in electrical switchgear devices and, more particularly, to a compartment barrier for use in padmounted switchgear for shielding certain elements of the switchgear from an access region located adjacent the elements.

2. Discussion of the Prior Art

Padmounted switchgear is conventionally used in underground electrical distribution systems to permit ground level access to switching systems in order to permit visual inspection and maintenance of the switching systems and to permit the distribution system to be conveniently operated by a worker standing on the ground adjacent the padmounted switchgear.

In the use of padmounted switchgear numerous circuit configurations are available. In one such circuit configuration two side-by-side three-phase circuits are provided, including a pair of three-phase switches positioned at a source side of the circuit and six fuses provided at the tap side of the circuit. Each circuit includes A, B and C phases, with both A phases, both B phases and both C phases connected together by buswork positioned intermediate the switches and fuses.

By providing this configuration all six of the tap lines may be fed through either of the switches at the source side of the circuit while the other of the switches is moved to an open position. For example, if the left source side switch is closed and the right source side switch is open, then both A phases, B phases and C phases on the tap side of the circuit are energized as are the downline switchgear elements of the open, right switch.

There may be times when it would be necessary or desirable to access the source side cable termination region adjacent an open switch when the adjoining switch is closed and the tap side of the circuit energized. In order to permit such access to the cable termination regions, it would be necessary to shield the downline switchgear elements in order to prevent inadvertent contact with these energized elements.

OBJECTS AND SUMMARY OF THE INVENTION

It is an object of the present invention to provide an electrical switchgear apparatus including a barrier between energized switchgear elements and an access region adjacent the elements for preventing inadvertent contact with the energized elements by an operator working within the access region.

It is another object of the invention to provide a switchgear device including a barrier for preventing closure of the switchgear during the time an operator is working within the access region.

A further object of the invention is to provide a switchgear device including a barrier that may be operated by a hotstick tool or the like for movement between a blocking position shielding a fixed element of the switchgear from the access region and a non-blocking position exposing the fixed element.

In accordance with these and other objects evident from the following description of the invention, an electrical distribution apparatus includes an enclosure defining an access region accessible from an area exterior of the enclosure and a shielded region that is to be normally shielded against access from the area exterior of the enclosure. A switchgear device includes a fixed element and a movable element, the fixed element being supported within the shielded region of the enclosure and the movable element being supported within the enclosure for movement between a closed, current-carrying position in contact with the fixed element within the shielded region and an open position out of contact with the fixed element. The movable element is disposed at least partially within the access region when in the open position.

A panel is supported on the enclosure between the shielded and access regions, and includes a slot through which the movable element passes during movement between the closed and open positions. A barrier member is supported on the panel and is movable horizontally relative to the panel between a blocking position in which the barrier member covers the slot and a non-blocking position in which the barrier member exposes the slot. The barrier member prevents inadvertent contact with the fixed element through the slot and prevents movement of the movable element between the open and closed positions when in the blocking position.

By constructing an apparatus in accordance with the present invention, numerous advantages are realized. For example, by providing a barrier movable between blocking and non-blocking positions, it is possible to shield a downline, energized switchgear element from an adjacent access region in order to prevent inadvertent physical contact by an operator or tool with the energized element.

Also, the movable barrier and panel together provide means for preventing closure of an upline movable element when the barrier is in a blocking position so that the movable element is prevented from becoming energized.

BRIEF DESCRIPTION OF THE DRAWING FIGURES

A preferred embodiment of the invention is described in detail below with reference to the attached drawing figures, wherein.

DETAILED DESCRIPTION OF THE PREFERRED EMBODIMENT

Figure 1:
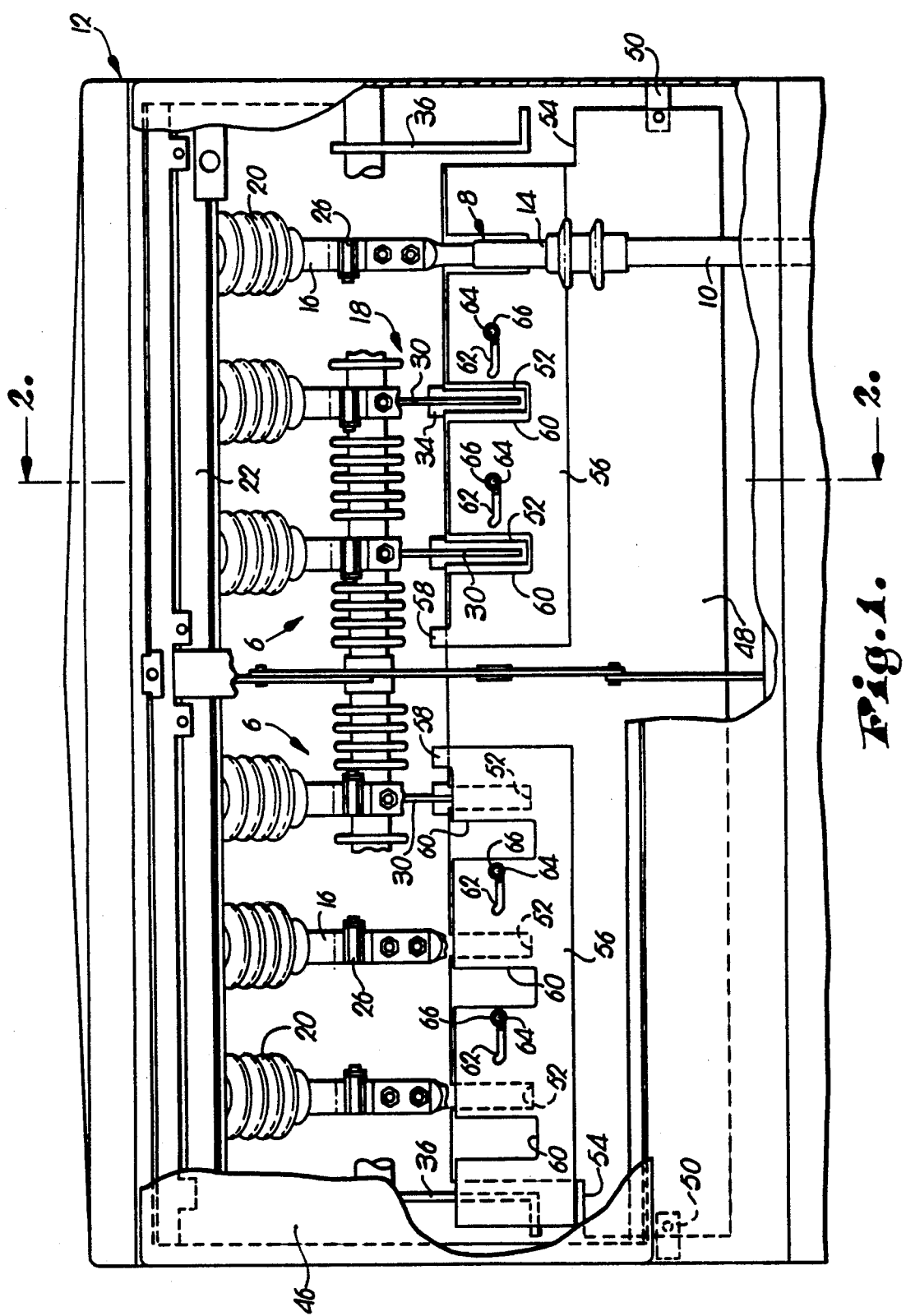
FIG. 1 is a front elevational view, partially cut away, of a multiple-phase electrical distribution apparatus constructed in accordance with a preferred embodiment of the present invention.

A padmounted switchgear apparatus constructed in accordance with a preferred embodiment of the invention is illustrated in FIG. 1. The padmounted switchgear can, e.g., be a 15 kV or 25 kV, Model 608 Air-Insulated Switch, marketed by A. B. Chance Company, which includes a live-front source side and a dead-front fuse side or the padmounted switchgear can be one which includes a live-front source side and a live-front fuse side. In the latter case, the floor could be used in both live-front cable compartments.

As shown in FIG. 1, the switchgear apparatus includes two side-by-side, three-phase switchgear assemblies 6 so as to permit the apparatus to be used in a loop-type distribution system. Each of the phases within the assemblies are spaced laterally from adjacent phases within the apparatus, and the assemblies are spaced laterally from one another in order to separate the assemblies physically and electrically from one another.

The circuit configuration of the apparatus includes two side-by-side three-phase circuits provided with a pair of three-phase switches positioned at the source side and six fuses provided at the tap side. Each circuit includes A, B and C phases, with both A phases, both B phases and both C phases connected together by buswork positioned intermediate the switches and fuses.

By providing this configuration all six of the tap lines may be fed through either of the switches at the source side of the circuit while the other of the switches is moved to an open position.

Figure 2:
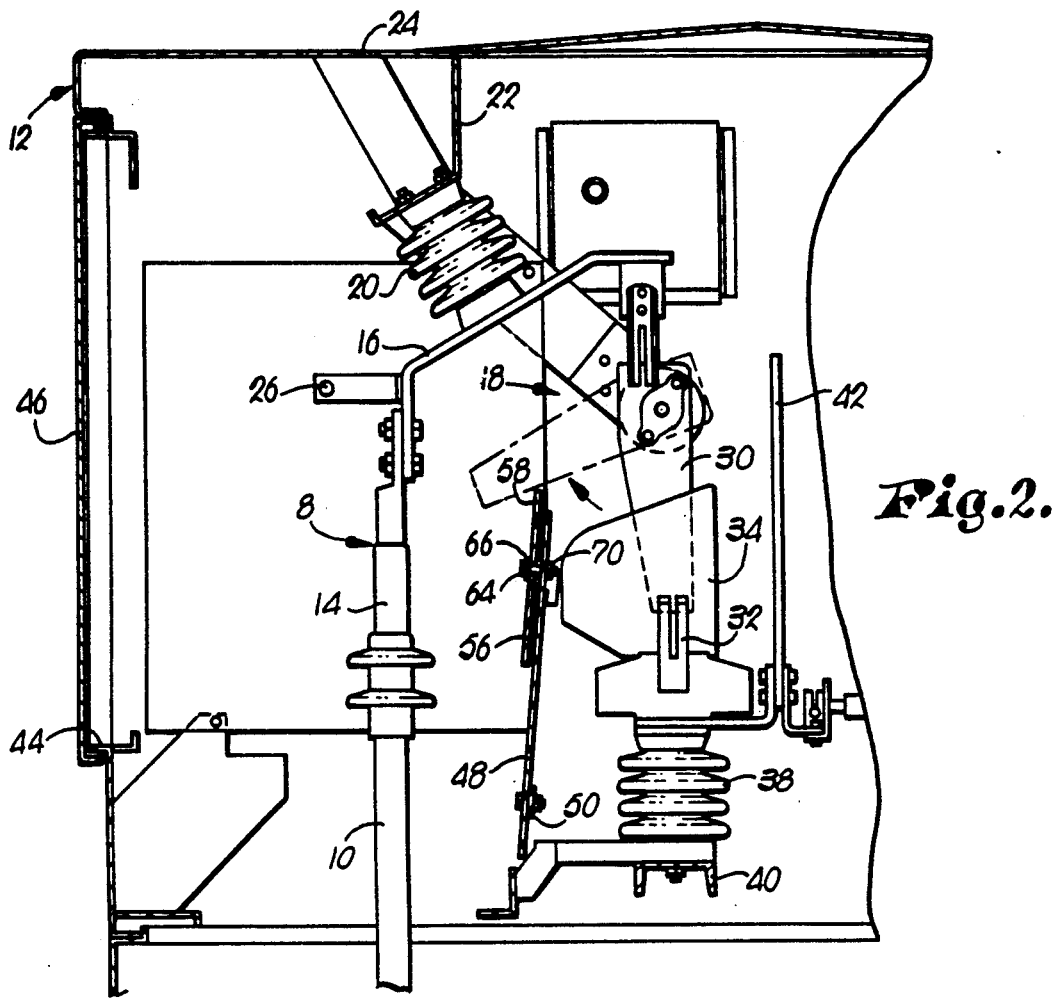
FIG. 2 is a sectional view of the apparatus taken along line 2—2 of FIG. 1.

Turning to FIG. 2, a single-phase line 8 of one of the switchgear assemblies 6 is illustrated. A primary power line 10 protrudes vertically into an enclosure 12 of the apparatus through an opening on the lower side of the enclosure. The power line 10 is connected to a live-front terminator 14 that is secured to a conductor 16 extending between the terminator and a switchgear device 18. The conductor 16 is supported within the enclosure by an insulator 20 secured to an upper source side panel 22 extending downward from an upper wall 24 of the enclosure, and a grounding rod 26 is secured to the conductor.

A movable element 30 of the switchgear device is connected to the conductor 16 and includes a blade that is pivotable about a shaft between a closed position, as shown in solid lines in FIG. 2, and an open position, as shown in broken lines in FIG. 2. When in the closed position, the blade is in engagement with a fixed element 32 of the switchgear device such that current flows through the device. When in the open position the blade is pivoted out of engagement with the fixed element. An arc chute 34 is secured to the fixed element and includes guide surfaces which guide the blade into contact with the fixed element when the blade is moved to the closed position.

As shown in FIG. 1, a separate mechanism is provided on each three-phase assembly for operating the three movable elements 30 in order to move the blades between the open and closed positions. Each mechanism includes an arm 36 inside the enclosure that is supported on the shaft for pivotal movement through an arc substantially parallel to the path traveled by the blades.

The fixed element 32 of the switchgear device 18 is supported on an insulator 38 secured to the enclosure by a bracket 40 extending between the sidewalls of the enclosure. The fixed element is connected to a U-shaped bus conductor 42 and to one contact of a fuse, not shown. The fuse includes a second contact which is connected through a dead-front, fuse-side terminator that is connected to a tap power line, also not shown.

An access opening 44 is provided on the source side of the enclosure adjacent the primary power lines 10, and a grounded panel 46 is fitted on the access opening in order to normally prevent access to the interior of the enclosure. The grounded panel may be opened by a lineman to permit measurements to be made or maintenance to be carried out within the enclosure.

Figure 3:
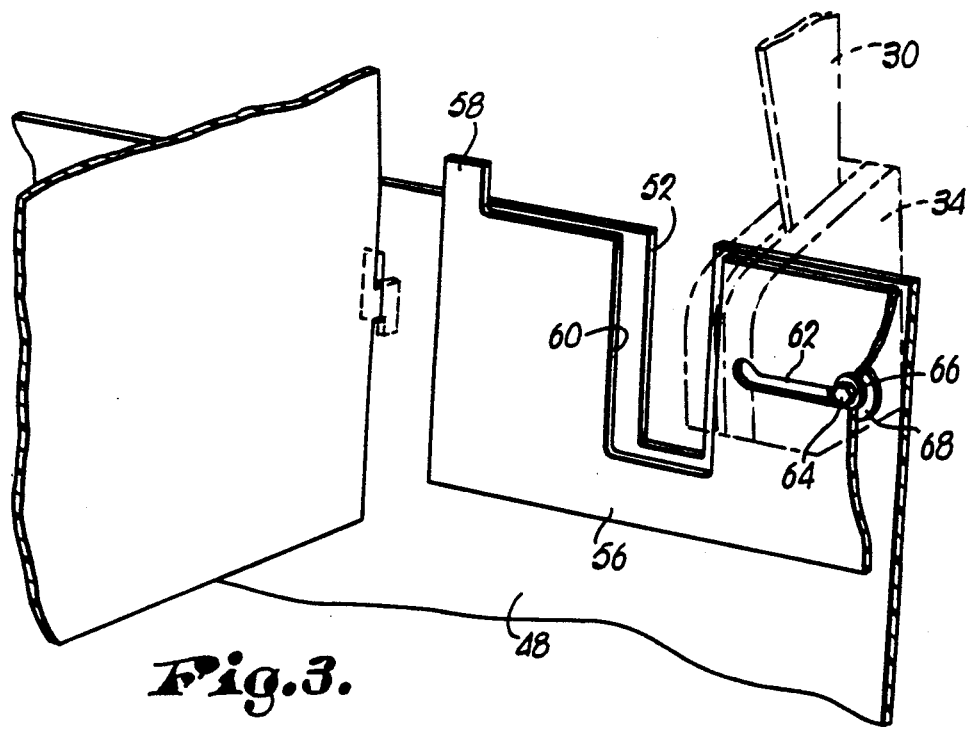
FIG. 3 is a perspective view illustrating a barrier member and the cooperating elements of the distribution apparatus.

As shown in FIG. 1, a panel 48 formed of insulative material is supported at each end by members 50. The panel extends from a lower edge adjacent the bottom of the enclosure to an upper edge adjacent the upper edge of the arc chutes 34 of the fixed switchgear elements. As illustrated in FIG. 2, the panel is positioned between the fixed elements of the switchgear assemblies and the source side terminators in order to define an access region within the enclosure between the access opening and the panel, and a shielded region interior of the panel. As illustrated in FIG. 3, the panel 48 is also supported in the middle by a center barrier transverse to the panel 48.

The panel includes three side-by-side, vertical slots 52 formed in the upper edge. The slots are aligned with the arc chutes and with the arcuate travel paths followed by the blades such that the blades are permitted to pivot into and out of contact with the fixed elements 32.

Further, a cut-out area 54 is provided in the panel at each end of the enclosure and aligns with the arm 36 of each operating mechanism so as to permit pivotal movement of the arm between a first position corresponding to the closed position of the movable elements and a second position corresponding to the open position of the movable elements.

A separate barrier member 56 is associated with each three-phase assembly and each barrier member is formed from a sheet of insulative material, such as a polyester glass laminate material. Each barrier member includes an upper edge adapted for alignment with the upper edge of the panel 48 and formed with an upstanding tab 58 by which the barrier member may be engaged by a hotstick tool or the like in order to permit movement of the barrier member horizontally between a blocking position, as shown on the left hand side of FIG. 1, and non-blocking position, as shown on the right hand side of FIG. 1.

The barrier members each include a lower edge adapted to extend beneath the lower extent of the slots 52, and each member is provided with three slots 60 sized to expose the slots 52 in the panel when the barrier member is moved to the non-blocking position.

Each barrier member is also provided with a plurality of interior slots 62 each having a shape which includes an elongated intermediate horizontal length and angled end portions. The angled end portions of the slots 62 angle upwardly away from one another.

As shown in FIG. 2, a plurality of bearing members 64 are fastened to the panel 48, and each preferably includes a bolt fitted through a washer 66, a spacer 68 and the panel and secured by a nut 70. The weight of each barrier member is supported on the bearing members 64, which fit within the slots 62. The slots 62 are sized to permit movement of each barrier member between the blocking and non-blocking positions, and the angled end portions of the slots 62 cause each barrier member to drop slightly as the end positions of movement are reached. Thus, each barrier member is stabilized in either the blocking or non-blocking position such that inadvertent movement of the member is prevented.

One side edge of each barrier member is sized to expose the cut-out area 54 of the panel when the barrier member is in the non-blocking position and to substantially cover the cut-out area when the member is moved to the blocking position.

During normal operation of the apparatus both barrier members are normally in the non-blocking position, i.e. the position illustrated on the right hand side of the apparatus in FIG. 1, with all of the movable elements 30 free to move toward or away from the fixed elements 32.

If it is desired or necessary to conduct measurements or maintenance at the source side of one of the three-phase assemblies 6, the mechanism for opening the movable elements is operated, moving the arm 36 as well as the movable elements from the closed current-carrying position, shown in solid lines in FIG. 2, to the open position, shown in broken lines in FIG. 2. During this movement the elements 30 pass through the slots 52 in the panel and the slots 60 in the barrier member 56. Thus, the blades are at least partially disposed within the access region of the enclosure when the blades are in the open position.

The barrier member associated with the open three-phase assembly is moved to the blocking position so that the slots 60 in the barrier member are displaced from the slots 52 in the panel and the barrier member covers the slots 52 as well as the cut-out area 54. In this manner, the arc chutes 34 are blocked from inadvertent contact and the movable elements, as well as the arm 36 of the mechanism, are prevented from moving back into the shielded region.

By preventing movement of the arm 36, the barrier member achieves the goal of insuring against closure of the switchgear device so that an operator may safely work within the access region without the possibility of the switchgear being closed. Further, the barrier prevents inadvertent contact between an operator or a tool and the fixed switchgear elements which, as discussed above, may remain energized even after opening of the particular switchgear device.

In order to permit the horizontal movement of the barrier member between positions, each bearing member 64 is secured to the panel in such a way as to permit sliding movement of the barrier member 56 relative to the panel while retaining the member on the bearing members.

Although the invention has been described with reference to the preferred embodiment illustrated in the drawing figures, it is noted that substitutions may be made and equivalents employed herein without departing from the scope of the invention as set forth in the claims.

What is claimed is:

1. An electrical distribution apparatus comprising:
and enclosure defining an access region accessible from an area exterior of the enclosure and a shielded region that is to be normally shielded against access from the area exterior of the enclosure;
a switchgear device including a fixed element and a movable element, the fixed element being supported within the shielded region of the enclosure and the movable element being supported within the enclosure for movement between a closed, current-carrying position in contact with the fixed element within the shielded region and an open position out of contact with the fixed element, the movable element being disposed at least partially within the access region when in the open position;
a panel supported on the enclosure between the shielded and access regions, the panel including a slot through which the movable element passes during movement between the closed and open positions;
a barrier member supported on the panel and movable horizontally relative to the panel between a blocking position in which the barrier member covers the slot and a non-blocking position in which the barrier member exposes the slot, the barrier member preventing inadvertent contact with the fixed element through the slot and preventing movement of the movable element between the open and closed positions when in the blocking position; and
shifting means for shifting the movable element between the open and closed positions, the shifting means including an arm supported within the enclosure and movable between a first position corresponding to the closed position of the movable element and a second position corresponding to the open position, the arm being disposed at least partially within the access region when in the second position, the panel having a portion cut away through which the arm passes during movement between the first and second positions, the barrier member covering the portion of the panel when the barrier member is in the blocking position in order to prevent movement of the arm from the second position to the first position.

2. An electrical distribution apparatus comprising:
an enclosure defining an access region accessible from an area exterior of the enclosure and a shielded region that is to be normally shielded against access from the area exterior of the enclosure;
a switchgear device including a fixed element and a movable element, the fixed element being supported within the shielded region of the enclosure and the movable element being supported within the enclosure for movement between a closed, current-carrying position in contact with the fixed element within the shielded region and an open position out of contact with the fixed element, the movable element being disposed at least partially within the access region when in the open position;
a panel supported on the enclosure between the shielded and access regions, the panel including a slot through which the movable element passes during movement between the closed and open positions;
a barrier member supported on the panel and movable horizontally relative to the panel between a blocking position in which the barrier member covers the slot and a non-blocking position in which the barrier member exposes the slot; and
a means for retaining the barrier member in each of the blocking and non-blocking positions and for preventing contact between the movable and fixed elements when the barrier member is in the blocking position movement of said barrier member being totally independent of movement of said switchgear movable element.

3. An electrical distribution apparatus as recited in claim 1, further comprising a rest secured to the panel on which the weight of the barrier member is carried, the barrier member including a bearing surface adapted to bear against the rest to support the barrier member relative to the panel, the bearing surface being of a length sufficient to permit the movement of the barrier member between the blocking and non-blocking positions and including end regions which are angled upward away from one another in order to permit the barrier member to drop vertically into the each of the blocking and non-blocking positions so that the barrier member is retained in the positions.

4. A electrical distribution apparatus as recited in claim 1, wherein the barrier member includes a pair of opposed, substantially vertical surfaces adapted to permit engagement of the barrier member by a tool used for moving the barrier member between the blocking and non-blocking positions.

5. An electrical distribution apparatus as recited in claim 4 wherein the pair of opposed vertical surfaces are defined by an upstanding tab provided on the barrier member.

6. An electrical distribution apparatus as recited in claim 1, further comprising an access opening adjacent the access region for permitting access to the region, the access opening being remote from the shielded region.

7. An electrical distribution apparatus as recited in claim 1, wherein the movable element is a blade, the apparatus further comprising mounting means for mounting the blade for pivotal movement about a substantially horizontal axes.

8. An electrical distribution apparatus as recited in claim 1, wherein the panel and the barrier member are formed of electrically insulative material.

9. An electrical distribution apparatus as recited in claim 1, wherein the panel and barrier member are formed of a polyester glass laminate material.

* * * * *